United States Patent
Ramsl

(10) Patent No.: US 12,242,808 B2
(45) Date of Patent: Mar. 4, 2025

(54) KNOWLEDGE GRAPH ENTITIES FROM TEXT

(71) Applicant: SAP SE, Walldorf (DE)

(72) Inventor: Hans-Martin Ramsl, Mannheim (DE)

(73) Assignee: SAP SE, Walldorf (DE)

( * ) Notice: Subject to any disclaimer, the term of this patent is extended or adjusted under 35 U.S.C. 154(b) by 287 days.

(21) Appl. No.: 17/738,898

(22) Filed: May 6, 2022

(65) Prior Publication Data

US 2023/0359825 A1    Nov. 9, 2023

(51) Int. Cl.
*G06F 40/295*    (2020.01)
*G06F 40/253*    (2020.01)
*G06N 3/042*    (2023.01)
*G06N 3/08*    (2023.01)
*G06N 5/022*    (2023.01)

(52) U.S. Cl.
CPC .......... *G06F 40/295* (2020.01); *G06F 40/253* (2020.01); *G06N 3/042* (2023.01); *G06N 3/08* (2013.01); *G06N 5/022* (2013.01)

(58) Field of Classification Search
CPC ..... G06F 40/295; G06F 40/253; G06N 3/042; G06N 3/08; G06N 5/022
See application file for complete search history.

(56) References Cited

U.S. PATENT DOCUMENTS

| | | | | |
|---|---|---|---|---|
| 2009/0063470 A1* | 3/2009 | Peled | | G06F 40/295 707/999.005 |
| 2021/0117509 A1* | 4/2021 | Aditya | | G06F 40/30 |
| 2022/0300544 A1* | 9/2022 | Potter | | G06F 16/35 |
| 2022/0309357 A1* | 9/2022 | Zhang | | G06F 40/211 |
| 2022/0366135 A1* | 11/2022 | Patel | | G06F 40/279 |
| 2023/0067688 A1* | 3/2023 | Pochernina | | G06F 16/367 |

(Continued)

FOREIGN PATENT DOCUMENTS

WO    WO-2022022045 A1 *    2/2022      G06F 16/367

OTHER PUBLICATIONS

Martinez-Rodriguez, Jose L., Ivan López-Arévalo, and Ana B. Rios-Alvarado. "Openie-based approach for knowledge graph construction from text." Expert Systems with Applications 113 (2018): 339-355. (Year: 2018).*

(Continued)

*Primary Examiner* — Brian L Albertalli
(74) *Attorney, Agent, or Firm* — SCHWEGMAN LUNDBERG & WOESSNER, P.A.

(57) ABSTRACT

Example methods and systems are directed to generating knowledge graph entities from text. Natural language text is received as input and processed using named entity recognition (NER), part of speech (POS) recognition, and business object recognition (BOR). The outputs of the NER, POS, and BOR processes are combined to generate knowledge entity triples comprising two entities and a relationship between them. Keywords are extracted from the text using NER to generate a set of entities. A node in a knowledge graph is created for at least some of the entities. A POS tagger identifies verbs in the text, generating a set of verbs. Relational verbs (e.g., "talk to" or "communicated with") are detected and used to create edges in the knowledge graph. The knowledge graph may be converted back to natural language text using a trained machine learning model.

20 Claims, 10 Drawing Sheets

(56) References Cited

U.S. PATENT DOCUMENTS

| | | | | |
|---|---|---|---|---|
| 2023/0136889 A1* | 5/2023 | Zopf | ............... | G06F 40/205 |
| | | | | 704/9 |
| 2023/0281467 A1* | 9/2023 | Eavy | ............ | G06F 16/9024 |
| | | | | 706/46 |
| 2023/0297855 A1* | 9/2023 | Hoang | ............. | G06N 3/042 |
| | | | | 706/52 |
| 2023/0351111 A1* | 11/2023 | Fauqueur | ......... | G06F 16/367 |

OTHER PUBLICATIONS

Koncel-Kedziorski, Rik, et al. "Text generation from knowledge graphs with graph transformers." arXiv preprint arXiv:1904.02342 (2019). (Year: 2019).*

Zhu, Ganggao, and Carlos A. Iglesias. "Computing semantic similarity of concepts in knowledge graphs." IEEE Transactions on Knowledge and Data Engineering 29.1 (2016): 72-85. (Year: 2016).*

Hensman, Svetlana, and John Dunnion. "Constructing conceptual graphs using linguistic resources." 4th WSEAS international Conference on Telecommunications and informatics. Husak M. and Mastorakis N., (Ed). World Scientific and Engineering Academy and Society (WSEAS), Stevens Point, Wisconsin. 2005. (Year: 2005).*

Sharma, Abhishek, Rajesh Swaminathan, and Hui Yang. "A verb-centric approach for relationship extraction in biomedical text." 2010 IEEE Fourth International Conference on Semantic Computing. IEEE, 2010. (Year: 2010).*

Saha, Swarnadeep. "Open information extraction from conjunctive sentences." Proceedings of the 27th International Conference on Computational Linguistics. 2018. (Year: 2018).*

* cited by examiner

KNOWLEDGE GRAPH ENTITIES FROM TEXT

TECHNICAL FIELD

The subject matter disclosed herein generally relates to generation of knowledge graph entities from text.

BACKGROUND

A knowledge graph uses nodes to represent real-world entities (e.g., objects or events) and edges to represent relationships between the real-world entities.

DETAILED DESCRIPTION

Figure 1:
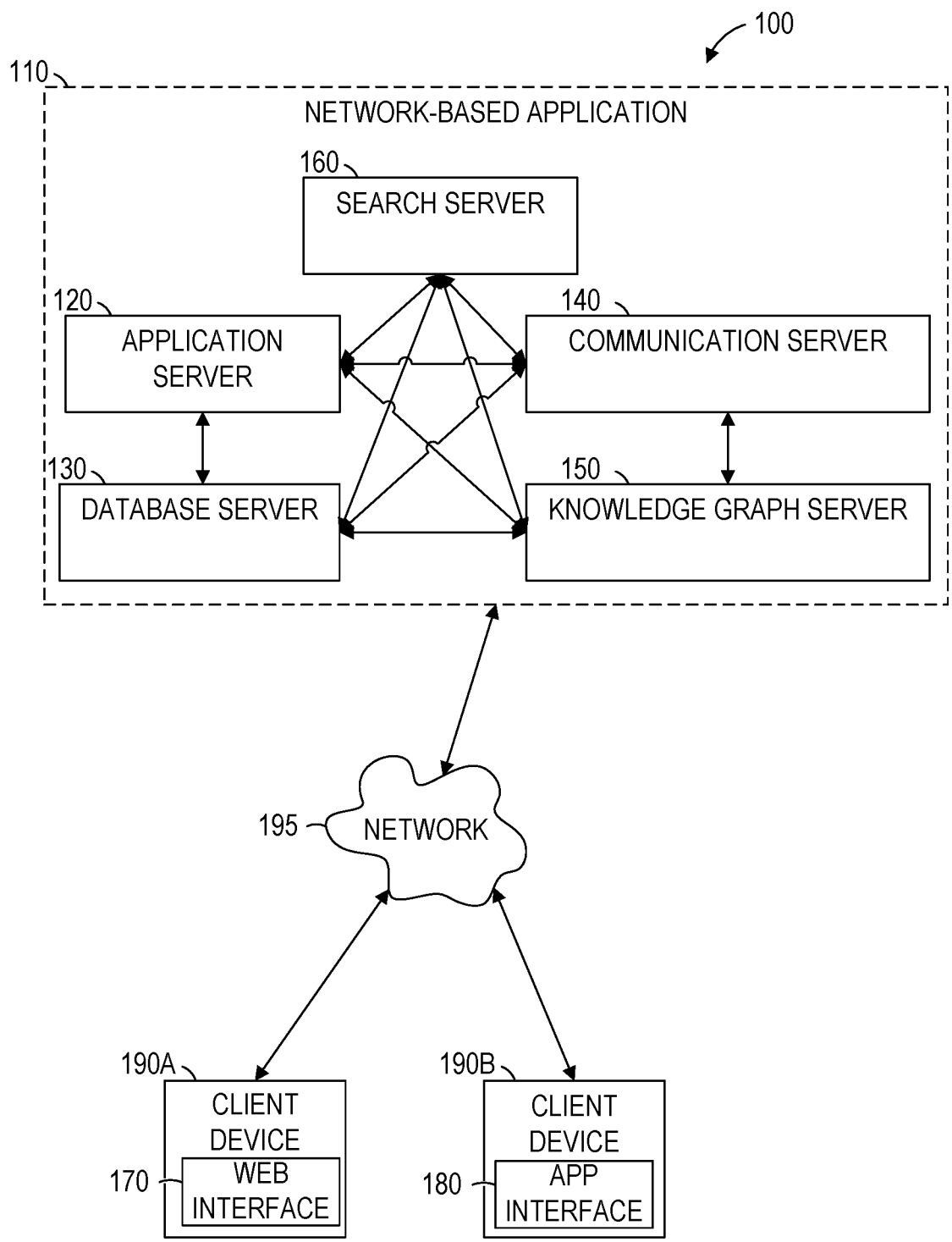
FIG. 1 is a network diagram illustrating an example network environment suitable for generating knowledge graph entities from text.

Example methods and systems are directed to generating knowledge graph entities from text. In practice, many information points are communicated via natural language documents such as emails, contracts, memoranda, text messages, and the like. Converting the information into knowledge graph entities may be useful to facilitate storage of the information in a database, support search and retrieval of desired information, compress the information, or any suitable combination thereof.

Natural language text is received as input and processed using named entity recognition (NER), part-of-speech (POS) tagging, and business object recognition (BOR). The outputs of the NER, POS, and BOR processes are combined to generate knowledge entity triples comprising two entities and a relationship between them.

Keywords are extracted from the text using NER to generate a set of entities. A node in a knowledge graph is created for at least some of the entities. A POS tagger identifies verbs in the text, generating a set of verbs. Relational verbs (e.g., "talk to" or "communicated with") are detected and used to create edges in the knowledge graph.

The knowledge graph may be converted back to natural language text using a trained machine learning model. The generation of the knowledge graph entities provides data for training the machine learning model. While the resulting text may not exactly match the original text, the information captured in the knowledge graph is maintained. Thus, the knowledge graph becomes a compressed version of the natural language text, reducing consumption of computing resources (e.g., storage).

A user interface may be presented that allows a user to search for portions of a knowledge graph that relate to a particular topic. For example, a text field may be presented into which the user may enter a text string. In response to the selected or entered topic, the user interface presents portions of the knowledge graph comprising a matching node.

A business object is an object (in the Object-Oriented Programming sense of the word) or data structure that represents a business entity. A business entity is any person, place, thing, document, or service that relates to a business. Example business entities include users (e.g., employees), customers, companies, sales orders, invoices, products, and services. A business object has a lifecycle in which the business object is created, used, and destroyed. For example, a business object for an employee is created when the employee is hired, maintained and modified during the employee's term of employment, and may be deleted or archived when the relationship with the employee is severed. A business process may correlate to a part of (or the entirety of) the lifecycle of a business object. For example, an individual sales order may be created, changed, and deleted, and XP-Functions reflect and visualize these operations for the individual sales order. By way of example, some of the methods and systems described herein operate on business processes and business objects, but the inventive subject matter is not so limited.

By comparison with existing methods of generating knowledge graphs from text, such as manually creating the knowledge graph using a separate tool, the methods and systems discussed herein improve functionality by allowing for automatic generation of the knowledge graph from text, reducing the level of effort required to gain the advantages of a knowledge graph representation of the information contained in the natural language text.

When these effects are considered in aggregate, one or more of the methodologies described herein may obviate a need for certain efforts or resources that otherwise would be involved in generating knowledge graphs. Computing resources used by one or more machines, databases, or networks may similarly be reduced. Examples of such computing resources include processor cycles, network traffic, memory usage, data storage capacity, power consumption, and cooling capacity.

FIG. 1 is a network diagram illustrating an example network environment 100 suitable for generating knowledge graph entities from text. The network environment 100 includes a network-based application 110, client devices 190A and 190B, and a network 195. The network-based application 110 is provided by an application server 120 in communication with a database server 130, a communication server 140, a knowledge graph server 150, and a search server 160. The application server 120 accesses application data (e.g., application data stored by the database server 130) to provide one or more applications to the client devices 190A and 190B via a web interface 170 or an application interface 180.

The application server 120, the database server 130, the communication server 140, the knowledge graph server 150, the search server 160, and the client devices 190A and 190B may each be implemented in a computer system, in whole or in part, as described below with respect to FIG. 10. The client devices 190A and 190B may be referred to collectively as client devices 190 or generically as a client device 190.

The application server 120 provides an application (e.g., an audio or multimedia meeting application, a dictation application, a multimedia recording application, a knowledge graph viewing, editing, or searching application, or any suitable combination thereof). The application server 120 may provide the web interface 170 or the application interface 180 to allow a user to create text or voice communications, to view or edit knowledge graphs, or any suitable combination thereof.

The communication server 140 receives commands from the application server 120 or from other devices connected to the network 195 and provides communication services. For example, the application server 120 may receive text for an email from a client device 190 and provide the text to the communication server 140 (e.g., an email server). In response, the communication server 140 may transmit the email to an identified destination. As another example, a client device 190 may provide text to the communication server 140 (either with or without intermediation by the application server 120) for communication via a web interface. The communication server 140 (e.g., a web application server) causes the text to be presented on a destination device. The text provided to the communication server 140 may be stored on the communication server 140 or by the database server 130.

The knowledge graph server 150 accesses the text of one or more communications and generates knowledge graph entities from the text. Generation of the knowledge graph entities may comprise performing NER on the text to identify named entities such as individuals, businesses, and the like. Verb recognition may also be performed on the text to identify actions and relations involving the named entities.

The search server 160 provides search functionality to the client devices 190 to search for data in a knowledge graph. Search criteria provided via the web interface 170 or the app interface 180 are used to identify corresponding nodes in one or more knowledge graphs. In response to the received search criteria, a user interface is presented on the client device 190 that identifies one or more responsive portions of the knowledge graphs, the text used to generate the knowledge graphs, or both.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the database server 130, the communication server 140, the knowledge graph server 150, the search server 160, and the client devices 190A-190B are connected by the network 195. The network 195 may be any network that enables communication between or among machines, databases, and devices. Accordingly, the network 195 may be a wired network, a wireless network (e.g., a mobile or cellular network), or any suitable combination thereof. The network 195 may include one or more portions that constitute a private network, a public network (e.g., the Internet), or any suitable combination thereof.

Figure 2:
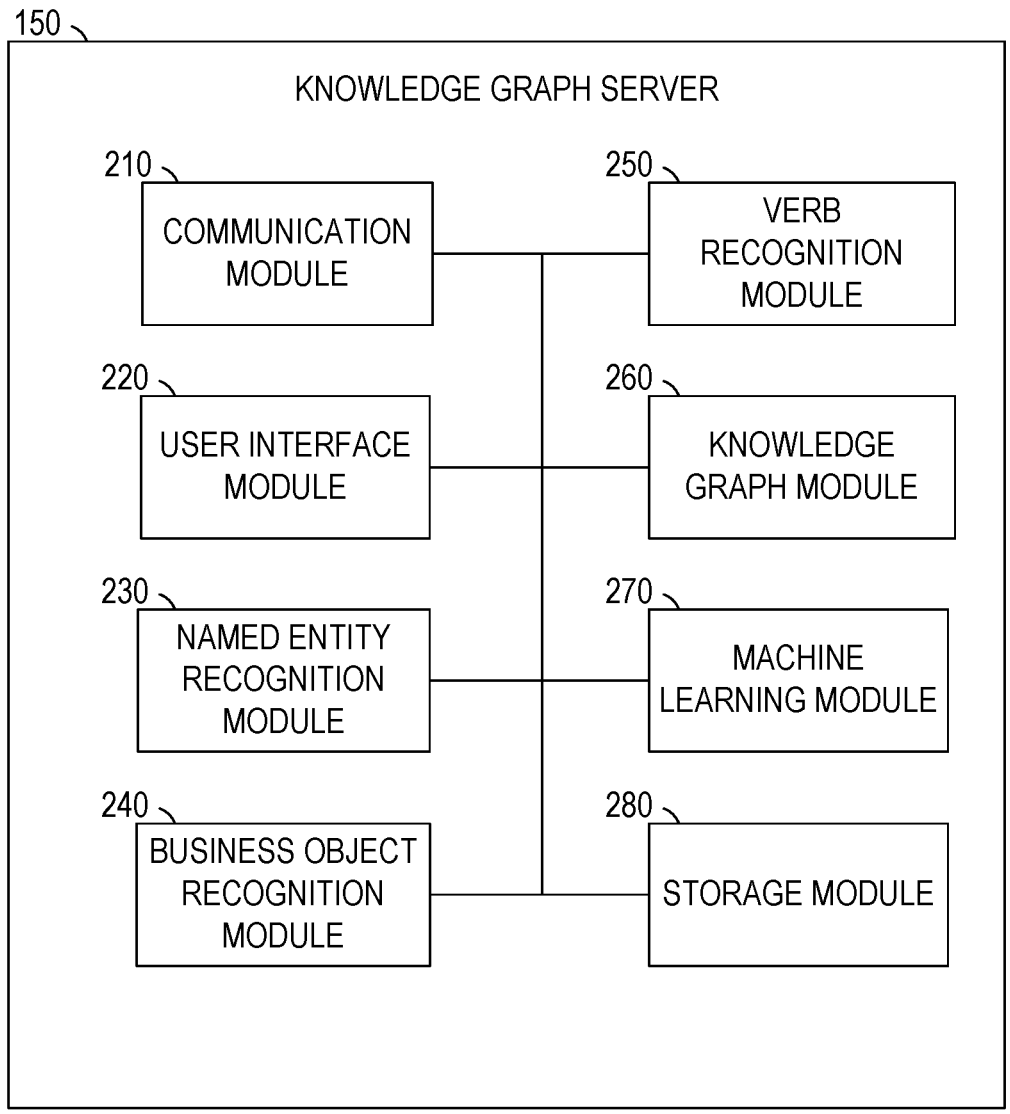
FIG. 2 is a block diagram of an example knowledge graph server, suitable for generating knowledge graph entities from text.

FIG. 2 is a block diagram of an example knowledge graph server 150, suitable for generating knowledge graph entities from text. The knowledge graph server 150 is shown as including a communication module 210, a user interface module 220, a named entity recognition module 230, a business object recognition module 240, a verb recognition module 250, a knowledge graph module 260, a machine learning module 270, and a storage module 280, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the knowledge graph server 150 and transmits data from the knowledge graph server 150. For example, the communication module 210 may receive, from the client device 190A or 190B, search criteria for searching for portions of a knowledge graph. The search criteria may comprise keywords, a selection of one or more source text files, or any suitable combination thereof. The knowledge graph to be searched by the knowledge graph server 150 may be stored on the knowledge graph server 150 (e.g., on a hard drive) or in remote storage (e.g., a network storage device such as the database server 130). Communications sent and received by the communication module 210 may be intermediated by the network 195.

A user interface for searching, generating a knowledge graph, sending communications, or any suitable combination thereof is provided by the knowledge graph server 150 using the user interface module 220. For example, a hypertext markup language (HTML) document may be generated by the user interface module 220, transmitted to a client device 190 by the communication module 210, and rendered on a display device of the client device 190 by a web browser executing on the client device 190. The user interface may comprise text fields, drop-down menus, and other input fields. The user interface may also comprise search results.

The named entity recognition module 230 recognizes named entities (e.g., persons, companies, organizations, or any suitable combination thereof) in text. For example, a text may be searched for predefined strings (e.g., "Larry," "Moe," or "SkyNet") that are the names of known people or businesses. As another example, the text may be searched for strings that match patterns (e.g., a sequence of digits) that may contain personally identifiable information (e.g., phone numbers or social security numbers). As still another example, each word of the text may be converted to a vector representation using an embedding module and provided to a trained machine learning model that generates as output a category identifier for the input word (e.g., person, business, or non-entity).

Business objects are recognized in text by the business object recognition module 240. For example, the word "invoice," when followed by a number, may be recognized as referring to a specific invoice business object. The invoice number may be looked up in an invoice database table to link the reference to other known data for the business object (e.g., date, amount, parties, and the like).

The verb recognition module 250 recognizes verbs and verb phrases in text. A part-of-speech tagger may be run on the text to determine the part of speech (e.g., noun, verb, adjective, and the like) for each word or phrase. Words and phrases tagged as verbs (e.g., base form verbs, past tense verbs, gerund or present participle verbs, past participle verbs, non-3rd person singular present verbs, 3rd person singular present verbs, or any suitable combination thereof) may be selected for further processing.

The words and phrases in the text that are tagged as verbs may be converted to word embeddings (e.g., using the FLAIR library) and compared to word embeddings for verb words and phrases in a vocabulary (e.g., from a list or database table) to determine which words and phrases in the text are verbs. For example, the vocabulary below may be used.

| Process Verbs | Express Verbs | Compete Verbs | Explore Verbs | Collaborate Verbs |
|---|---|---|---|---|
| Ripen | Build | Win | View | Comment |
| Change | Design | Compare | Collect | Like |
| Strengthen | Create | Challenge | Rate | Greet |
| Grow | Purchase | Taunt | Vote | Share |
| Deteriorate | Decorate | | Review | Help |
| Become | Customize | | Curate | Give |
| Die | Choose | | | Talk to |
| Go | | | | Communicated with |
| Come | | | | Discuss with |
| Fall | | | | Disagree |
| | | | | Believe |
| | | | | Sell to |
| | | | | Convince of |

Based on the named entities recognized by the named entity recognition module 230, the business objects recognized by the business object recognition module 240, and the verbs recognized by the verb recognition module 250, the knowledge graph module 260 generates a knowledge graph based on text.

The NER module 230, the business object recognition module 240, and the verb recognition module 250 may make use of the Flair framework described in *FLAIR: An easy-to-use framework for state-of-the art NLP*, 2019 ANNUAL CONFERENCE OF THE NORTH AMERICAN CHAPTER OF THE ASSOCIATION FOR COMPUTATIONAL LINGUISTICS (DEMONSTRATIONS) pp. 54-59, Akbik et al.

The machine learning module 270 trains machine learning models to perform various functions based on training data. For example, a machine learning model may be trained to generate text from a knowledge graph, to recognize named entities in text, to recognize business objects in text, to recognize verbs in text, or any suitable combination thereof.

Trained machine learning models, search queries, search results, audio files, annotation files, or any suitable combination thereof may be stored and accessed by the storage module 280. For example, local storage of the knowledge graph server 150, such as a hard drive, may be used. As another example, network storage may be accessed by the storage module 280 via the network 195.

Figure 3:
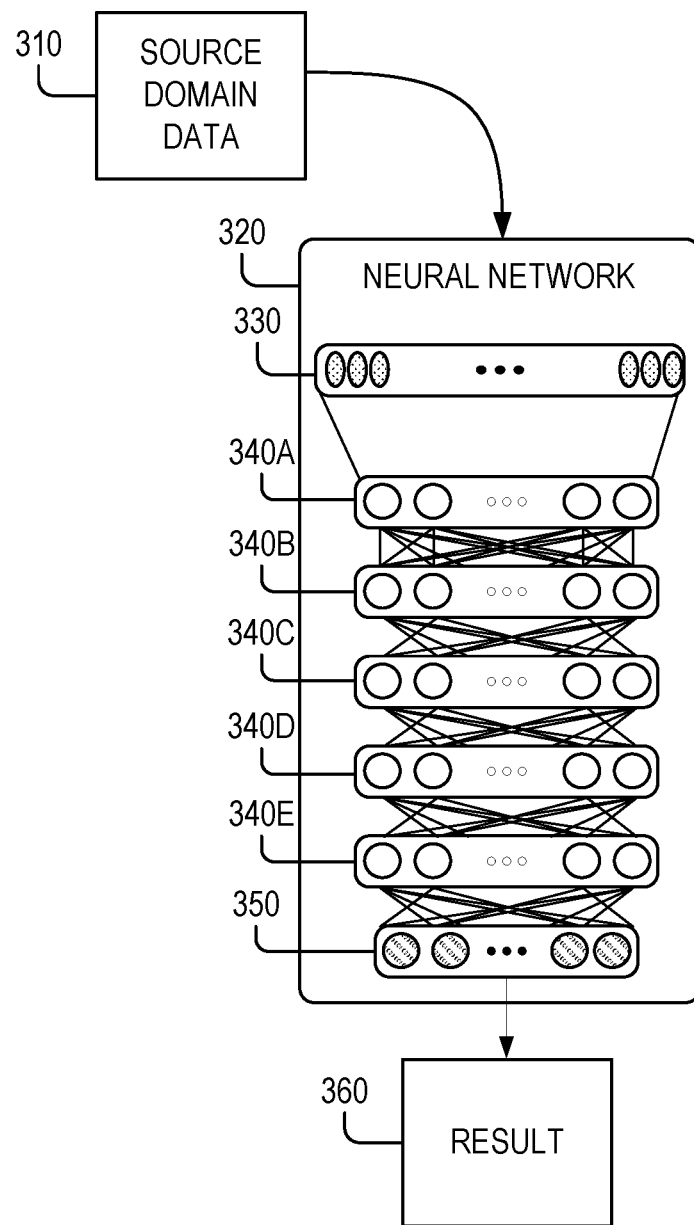
FIG. 3 is a block diagram of an example neural network, suitable for use in generating text from knowledge graph entities.

FIG. 3 illustrates the structure of an example neural network 320. The neural network 320 takes source domain data 310 as input; processes the source domain data 310 using the input layer 330; the intermediate, hidden layers 340A, 340B, 340C, 340D, and 340E; and the output layer 350 to generate a result 360.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images.

A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

Each of the layers 330-350 comprises one or more nodes (or "neurons"). The nodes of the neural network 320 are shown as circles or ovals in FIG. 3. Each node takes one or more input values, processes the input values using zero or more internal variables, and generates one or more output values. The inputs to the input layer 330 are values from the source domain data 310. The output of the output layer 350 is the result 360. The intermediate layers 340A-340E are referred to as "hidden" because they do not interact directly with either the input or the output, and are completely internal to the neural network 320. Though five hidden layers are shown in FIG. 3, more or fewer hidden layers may be used.

A model may be run against a training dataset for several epochs, in which the training dataset is repeatedly fed into the model to refine its results. In each epoch, the entire training dataset is used to train the model. Multiple epochs (e.g., iterations over the entire training dataset) may be used to train the model. The number of epochs may be 10, 100, 500, 1000, or another number. Within an epoch, one or more batches of the training dataset are used to train the model. Thus, the batch size ranges between 1 and the size of the training dataset while the number of epochs is any positive integer value. The model parameters are updated after each batch (e.g., using gradient descent).

In a supervised learning phase, a model is developed to predict the output for a given set of inputs and is evaluated over several epochs to more reliably provide the output that is specified as corresponding to the given input for the greatest number of inputs for the training dataset. The training dataset comprises input examples with labeled outputs. For example, a user may label images based on their content and the labeled images may be used to train an image identifying a model to generate the same labels.

For self-supervised learning, the training dataset comprises self-labeled input examples. For example, a set of color images could be automatically converted to black-and-white images. Each color image may be used as a "label" for the corresponding black-and-white image and used to train a model that colorizes black-and-white images. This process is self-supervised because no additional information, outside of the original images, is used to generate the training dataset. Similarly, when text is provided by a user, one word in a sentence can be masked and the network trained to predict the masked word based on the remaining words.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. The finalized models may be evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusters is used to select a model that produces the clearest bounds for its clusters of data.

The neural network 320 may be a deep learning neural network, a deep convolutional neural network, a recurrent neural network, or another type of neural network. A neuron is an architectural element used in data processing and artificial intelligence, particularly machine learning. A neuron implements a transfer function by which a number of inputs are used to generate an output. The inputs may be weighted and summed, with the result compared to a threshold to determine if the neuron should generate an output signal (e.g., a 1) or not (e.g., a 0 output). Through the training of a neural network, the inputs of the component neurons are modified. One of skill in the art will appreciate that neurons and neural networks may be constructed programmatically (e.g., via software instructions) or via specialized hardware linking each neuron to form the neural network.

An example type of layer in the neural network 320 is a Long Short Term Memory (LSTM) layer. An LSTM layer includes several gates to handle input vectors (e.g., time-series data), a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task which the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

The structure of each layer may be predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

One of ordinary skill in the art will be familiar with several machine learning algorithms that may be applied with the present disclosure, including linear regression, random forests, decision tree learning, neural networks, deep neural networks, genetic or evolutionary algorithms, and the like.

Figure 4:
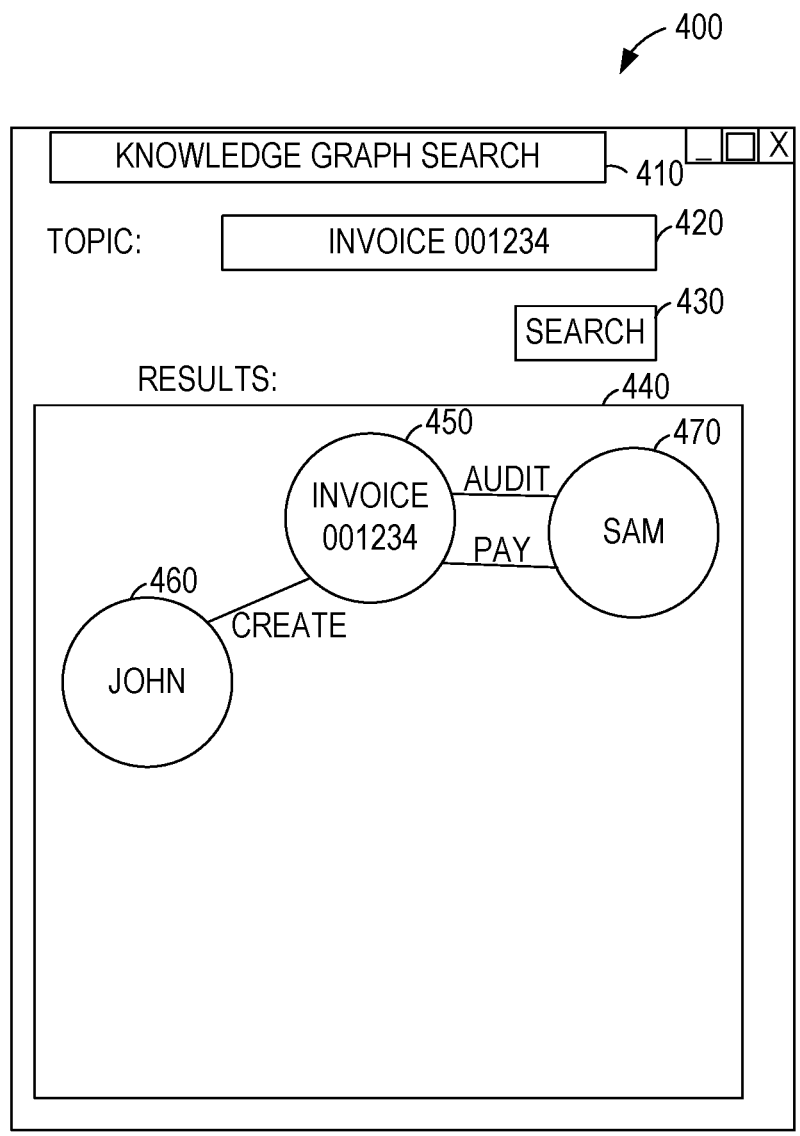
FIG. 4 is a block diagram of an example user interface for searching for portions of a knowledge graph relating to a selected topic and presenting search results.

FIG. 4 is a block diagram of an example user interface 400 for searching for portions of a knowledge graph relating to a selected topic and presenting search results. The user interface 400 includes a title 410, a topic field 420, a button 430, and a results area 440. The results area 440 shows a portion of a knowledge graph comprising nodes 450, 460, and 470. The user interface 400 may be presented on a display device of the client device 190A in response to data or instructions received from the application server 120, the search server 160, the knowledge graph server 150, or any suitable combination thereof. For example, a web page may be generated by the user interface module 220 and transmitted over the network 195 by the communication module 210. The web interface 170 of the client device 190A may interpret the received web page and generate the user interface 400.

The title 410 indicates that the user interface 400 provides for search of a knowledge graph. The user may input a topic into the topic field 420 (e.g., a text field, a drop-down list, or a combo box). The topic may be transmitted from the client device 190A to the search server 160 over the network 195 in response to detection of a press of the button 430. The search server 160 searches the nodes of a knowledge graph to identify any nodes matching the selected topic. In this example, the node 450 matches the selected topic. The node 450 and any nodes connected to the node 450 (e.g., the nodes 460 and 470) are displayed in the results area 440.

Thus, by use of the user interface 400, a user is enabled to search for portions of a knowledge graph that match or are related to a user-selected topic. This feature saves user time and effort as well as processor cycles, battery power, and other computer resources that would otherwise be expended in reviewing an entire knowledge graph to identify portions of interest. Furthermore, computing resources expended to identify a matching node in a knowledge graph are less than the computing resources that would be expended to identify matching text in a body of text, since the knowledge graph representation of data is smaller than the text representation. Accordingly, resources are saved by searching the knowledge graph entities generated from text over searching for data in the text itself.

Figure 5:
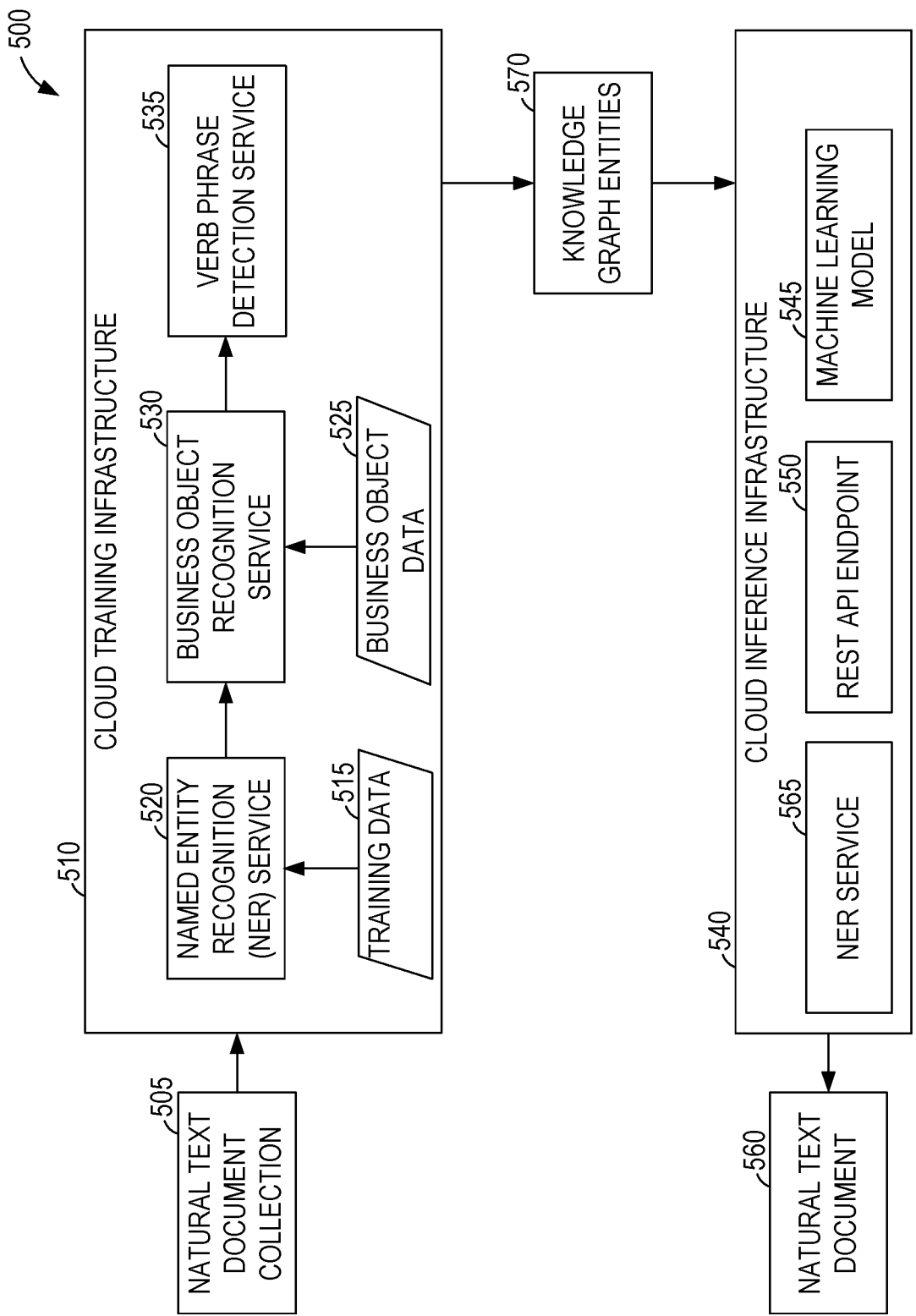
FIG. 5 is a block diagram illustrating a structure for generating knowledge graph entities from text.

FIG. 5 is a block diagram illustrating structure 500 for generating knowledge graph entities from text. The structure 500 includes an input natural text document collection 505 that is processed by the cloud training infrastructure 510 to generate knowledge graph entities 570. The cloud inference infrastructure 540 operates on the knowledge graph entities 570 to generate a natural text document 560. The cloud training infrastructure 510 includes a NER service 520 that is trained using training data 515, a business object recognition service 530 that is trained using business object data 525, and a verb phrase detection service 535. The cloud inference infrastructure 540 includes a NER service 565, a representational state transfer (REST) application programming interface (API) endpoint 550, and a machine learning model 545.

The NER service 520 and business object recognition service 530 may be machine-learning models. The training data 515 may comprise a set of training documents comprising named entities. The business object data 525 may comprise a set of training documents comprising business objects. The training documents for the training data 515 and the business object data 525 may be the same documents, with different annotations to indicate the results to be generated by the trained models.

The cloud training infrastructure 510 receives the natural text document collection 505 as input. The natural text document collection 505 is processed by the NER service 520 to identify named entities (e.g., people, businesses, or governments). The natural text document collection 505 is processed by the business object recognition service 530 to identify business objects (e.g., invoices, receipts, or projects). The verb phrase detection service 535 processes the natural text document collection 505 to identify verb phrases (e.g., relationships between entity pairs, business object pairs, or entities and business objects). Based on the identified entities, business objects, and verb phrases, the cloud training infrastructure 510 generates the knowledge graph entities 570. The knowledge graph entities 570 may be considered a compressed version of the natural text document collection 505, with text other than the named entities, business objects, and verb phrases excluded.

The cloud inference infrastructure 540 receives the knowledge graph entities 570 as input. The REST API endpoint 550 provides a programmatic interface to the cloud inference infrastructure 540. For example, a request may be received by the REST API endpoint 550 to convert all of the knowledge graph entities 570 to natural language text. As another example, a request may be received by the REST API endpoint 550 to convert portions of the knowledge graph entities 570 to text, wherein the portions match criteria included in the request. Example criteria include named entities (e.g., requesting portions of the knowledge graph entities 570 relating to the identified named entities), business objects (e.g., requesting portions of the knowledge graph entities 570 relating to the identified business objects), and verb phrases (e.g., requesting portions of the knowledge graph entities 570 that are related using the identified verb phrases).

The machine learning model 545 generates natural language text for the requested portion of the knowledge graph entities 570 and generates the natural text document 560 as output.

Figure 6:
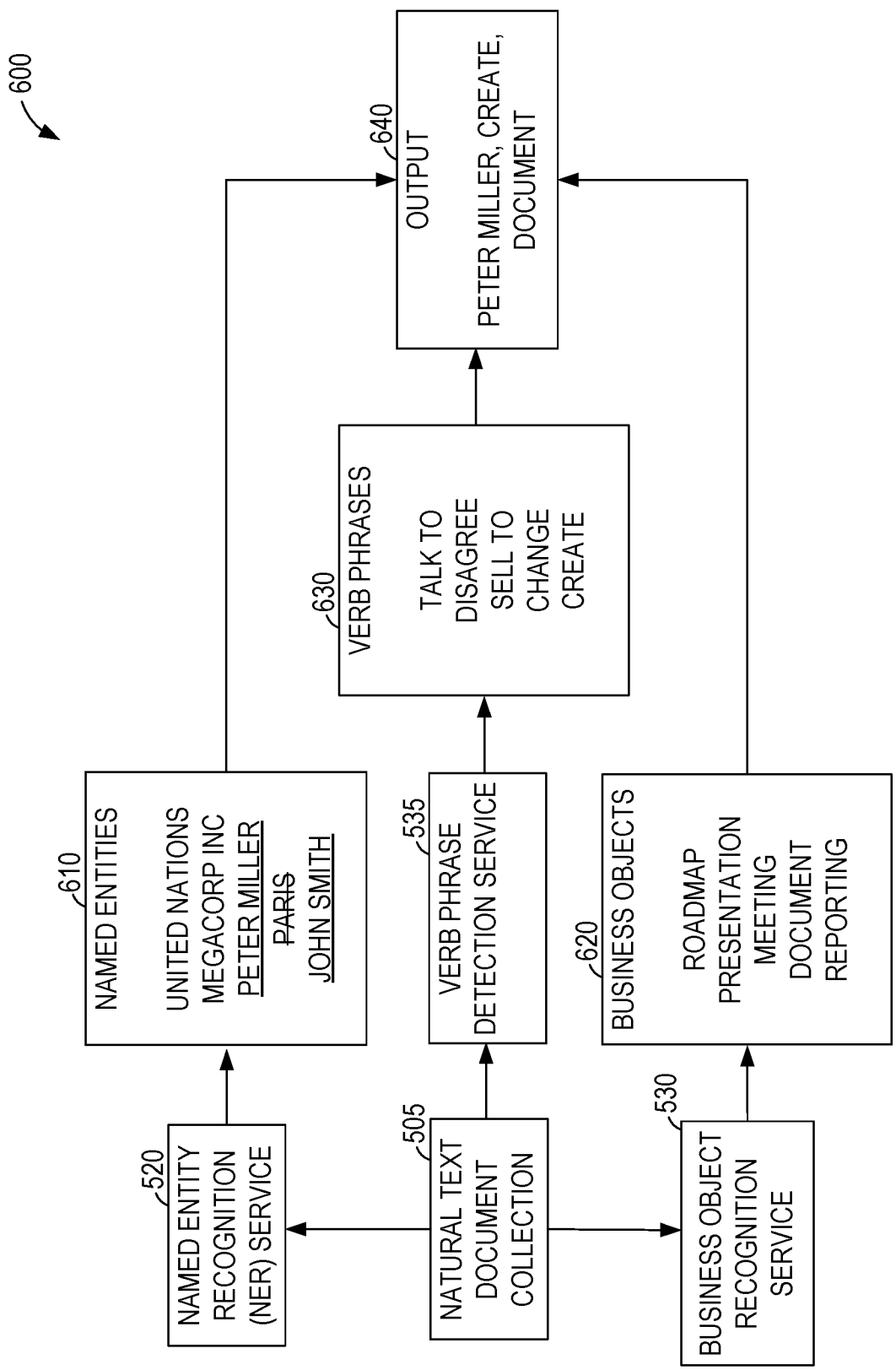
FIG. 6 is a block diagram of example data used in generating knowledge graph entities from text.

FIG. 6 is a block diagram 600 of example data used in generating knowledge graph entities from text. The block diagram 600 includes the natural text document collection 505, the NER service 520, the business object recognition service 530, and the verb phrase detection service 535, all of which are also shown in FIG. 5. Additionally, the block diagram 600 includes the named entities 610, the business objects 620, the verb phrases 630, and the output 640.

As discussed with respect to FIG. 5, the natural text document collection 505 is provided as input to the NER service 520. The NER service 520 generates the named entities 610 based on the natural text document collection 505. In this example, the named entities 610 comprises five named entities with three different degrees of recognition. "Peter Miller" and "John Smith" are strongly recognized, "United Nations" and "Megacorp Inc." are moderately recognized, and Paris is weakly recognized.

The natural text document collection 505 is also provided as input to the business object recognition service 530. The business object recognition service 530 generates the business objects 620 based on the natural text document collection 505. In this example, there are five recognized business objects.

The verb phrase detection service 535 generates the verb phrases 630 based on the natural text document collection 505. In this example, there are five detected verb phrases. The named entities 610, the business objects 620, and the verb phrases 630 are used to generate the output 640, showing a "create" relationship between the named entity "Peter Miller" and the business object "document."

Figure 7:
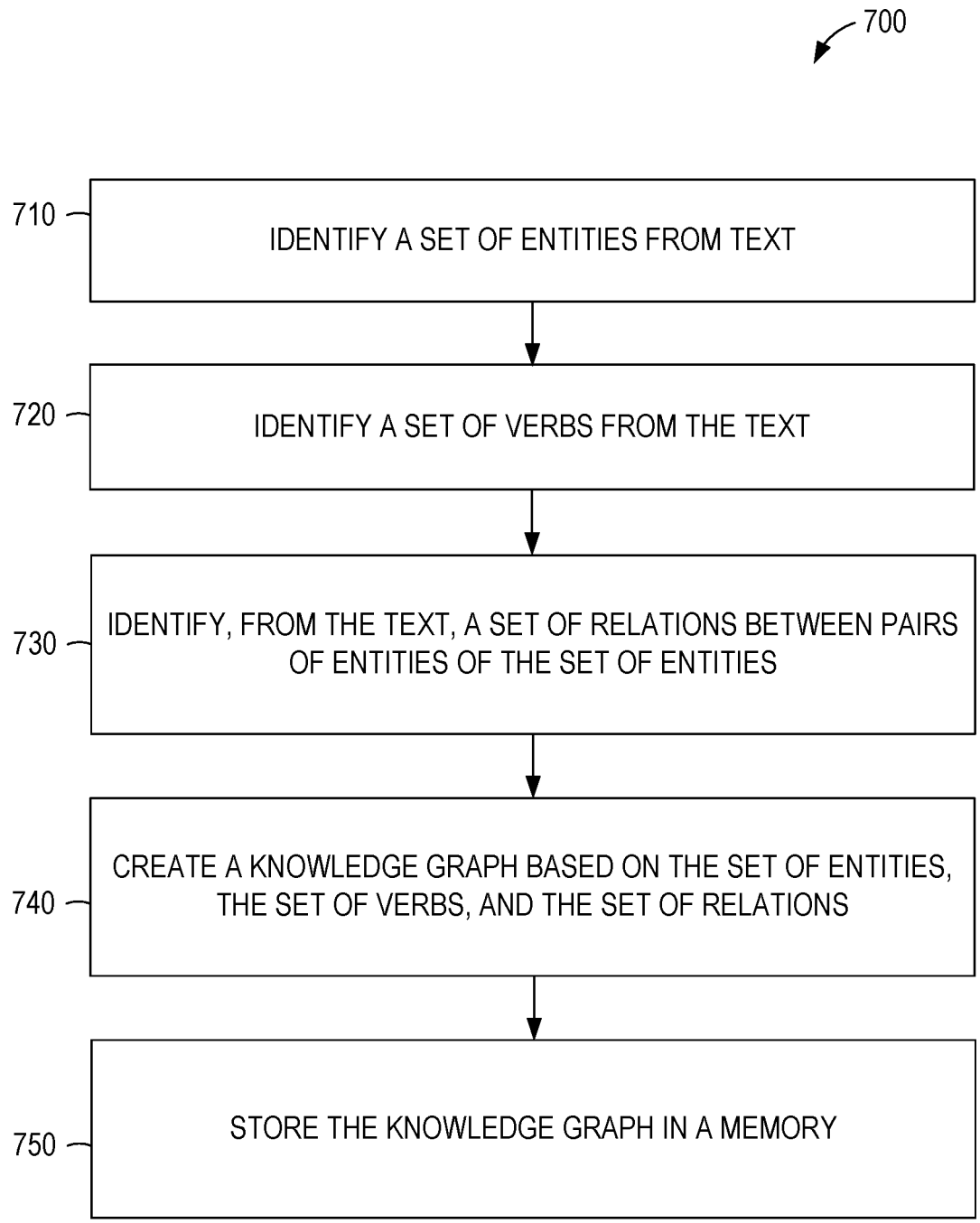
FIG. 7 is a flowchart illustrating operations of an example method suitable for generating knowledge graph entities from text.

FIG. 7 is a flowchart illustrating operations of an example method 700 suitable for generating knowledge graph entities from text. The method 700 includes operations 710, 720, 730, 740, and 750. By way of example and not limitation, the method 700 may be performed by the knowledge graph server 150 of FIG. 1, using the modules, structures, and interfaces shown in FIGS. 2-6.

In operation 710, the named entity recognition module 230 of the knowledge graph server 150 identifies a set of entities from text (e.g., an email). For example, the NER service 520 may be implemented as a machine learning model trained using training data 515. The trained machine learning model receives text as input and outputs an indication of which words and phrases in the input text identify entities.

The verb recognition module 250, in operation 720, identifies a set of verbs from the text. For example, the verb phrase detection service 535 may receive words and phrases from the text as input and, for each input, output an indication of whether the word or phrase is a verb (or verb phrase). The detection may be implemented by looking up words in a database of verbs (e.g., using a lookup table that contains a list of known verbs and verb phrases).

Based on the set of verbs and the set of entities, the knowledge graph module 260 identifies, in operation 730, a set of relations between pairs of entities of the set of entities. For example, when two entities appear in a single sentence with a single verb phrase, the two entities may be determined to have a relationship denoted by the word phrase. To illustrate, the phrase "John and Jim worked together" may be used to identify a relationship of "worked together" between entities "John" and "Jim."

In operation 740, the knowledge graph module 260 creates a knowledge graph based on the set of entities, the set of verbs, and the set of relations. Thus, nodes and edges are created to store the inter-related entities and their relationships.

The knowledge graph is stored, in operation 750, in a memory. For example, the knowledge graph may be stored in a database of the database server 130. The original text may or may not be stored in the memory as well. When the original text is not stored in the memory, the knowledge graph serves as a compressed version of the original text, reducing memory consumption. The knowledge graph may be more readily searchable than the original text, since processing to identify relationships between entities has already been performed and information not relating to entities and their relationships has already been removed, and thus would not be searched. Two knowledge graphs generated by application of the method 700 to different texts may be compared to determine a degree of similarity between the two texts.

The generated knowledge graph may be used to sort or search documents based on their contents. For example, a search for documents mentioning a particular entity may be executed by searching the knowledge graphs representing the documents for nodes matching the entity rather than searching the plain text of the documents themselves. The search of the nodes may be faster than the search of the text, reducing CPU and power usage and saving time.

Thus, by the use of the method 700, knowledge graph entities are generated from text and stored, reducing the usage of memory resources and improving the efficiency of search.

Figure 8:
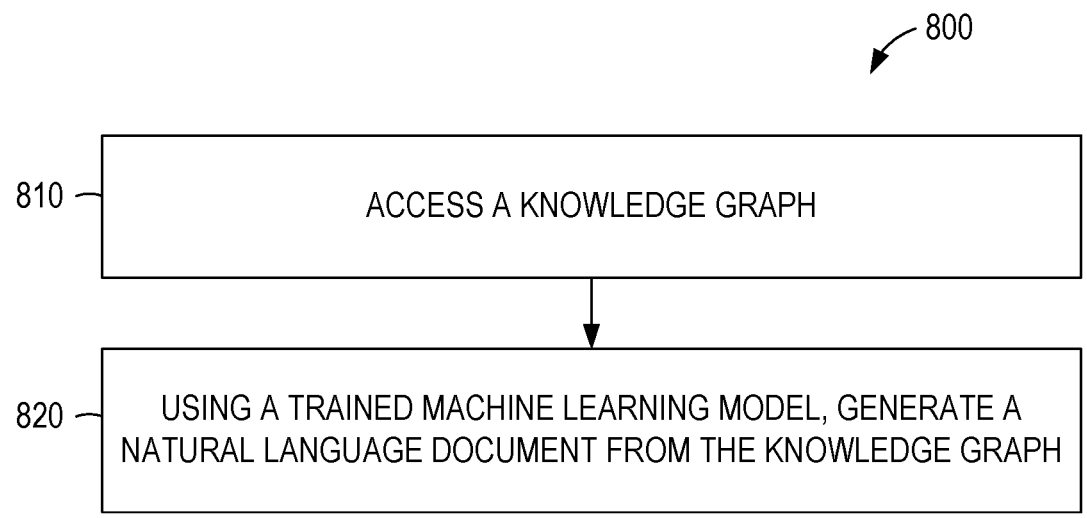
FIG. 8 is a flowchart illustrating operations of an example method suitable for generating text from knowledge graph entities.

FIG. 8 is a flowchart illustrating operations of an example method 800 suitable for generating text from knowledge graph entities. The method 800 includes operations 810 and 820. By way of example and not limitation, the method 800 may be performed by the knowledge graph server 150, using the modules, structures, and interfaces shown in FIGS. 2-6.

In operation 810, the knowledge graph server 150 accesses a knowledge graph. For example, a knowledge graph generated using the method 700 may be accessed. Using a trained machine learning model, the knowledge graph server 150 generates a natural language document from the knowledge graph (operation 820). For example, the cloud inference infrastructure 540 may generate the natural text document 560 from the knowledge graph entities 570.

Thus, by use of the methods 700 and 800, a natural text document can be created from a knowledge graph, allowing reconstitution of much of the meaning of a natural text document that was used to generate the knowledge graph.

In view of the above-described implementations of subject matter, this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: identifying, by one or more processors, a set of entities from text; identifying, by the one or more processors, a set of verbs from the text; identifying, by the one or more processors and from the text, a set of relations between pairs of entities of the set of entities; creating, by the one or more processors, a knowledge graph based on the set of entities, the set of verbs, and the set of relations; and storing the knowledge graph in a memory.

In Example 2, the subject matter of Example 1, wherein the storing of the knowledge graph in the memory comprises not storing the text in the memory.

In Example 3, the subject matter of Examples 1-2, wherein the identifying of the set of entities from the text comprises applying named entity recognition (NER) to the text.

In Example 4, the subject matter of Examples 1-3, wherein the identifying of the set of verbs from the text comprises looking up words in a database of verbs.

In Example 5, the subject matter of Examples 1-4, wherein the identifying of the set of entities from the text comprises applying business object recognition to the text.

In Example 6, the subject matter of Examples 1-5 includes comparing the knowledge graph and a second knowledge graph to determine a degree of similarity between the text and a second text.

In Example 7, the subject matter of Examples 1-6, wherein the text is an email.

In Example 8, the subject matter of Examples 1-7 includes using a trained machine learning model, generating an approximation of the text from the knowledge graph.

Example 9 is a system comprising: a memory that stores instructions; and one or more processors configured by the instructions to perform operations comprising: identifying a set of entities from text; identifying a set of verbs from the text; identifying, from the text, a set of relations between pairs of entities of the set of entities; creating a knowledge graph based on the set of entities, the set of verbs, and the set of relations; and storing the knowledge graph in a memory.

In Example 10, the subject matter of Example 9, wherein the storing of the knowledge graph in the memory comprises not storing the text in the memory.

In Example 11, the subject matter of Examples 9-10, wherein the identifying of the set of entities from the text comprises applying named entity recognition (NER) to the text.

In Example 12, the subject matter of Examples 9-11, wherein the identifying of the set of verbs from the text comprises looking up words in a database of verbs.

In Example 13, the subject matter of Examples 9-12, wherein the identifying of the set of entities from the text comprises applying business object recognition to the text.

In Example 14, the subject matter of Examples 9-13, wherein the operations further comprise: comparing the knowledge graph and a second knowledge graph to determine a degree of similarity between the text and a second text.

In Example 15, the subject matter of Examples 9-14, wherein the text is an email.

In Example 16, the subject matter of Examples 9-15, wherein the operations further comprise: using a trained machine learning model, generating an approximation of the text from the knowledge graph.

Example 17 is a non-transitory computer-readable medium that stores instructions that, when executed by one or more processors, cause the one or more processors to perform operations comprising: identifying a set of entities from text; identifying a set of verbs from the text; identifying, from the text, a set of relations between pairs of entities of the set of entities; creating a knowledge graph based on the set of entities, the set of verbs, and the set of relations; and storing the knowledge graph in a memory.

In Example 18, the subject matter of Example 17, wherein the storing of the knowledge graph in the memory comprises not storing the text in the memory.

In Example 19, the subject matter of Examples 17-18, wherein the identifying of the set of entities from the text comprises applying named entity recognition (NER) to the text.

In Example 20, the subject matter of Examples 17-19, wherein the identifying of the set of verbs from the text comprises looking up words in a database of verbs.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 9:
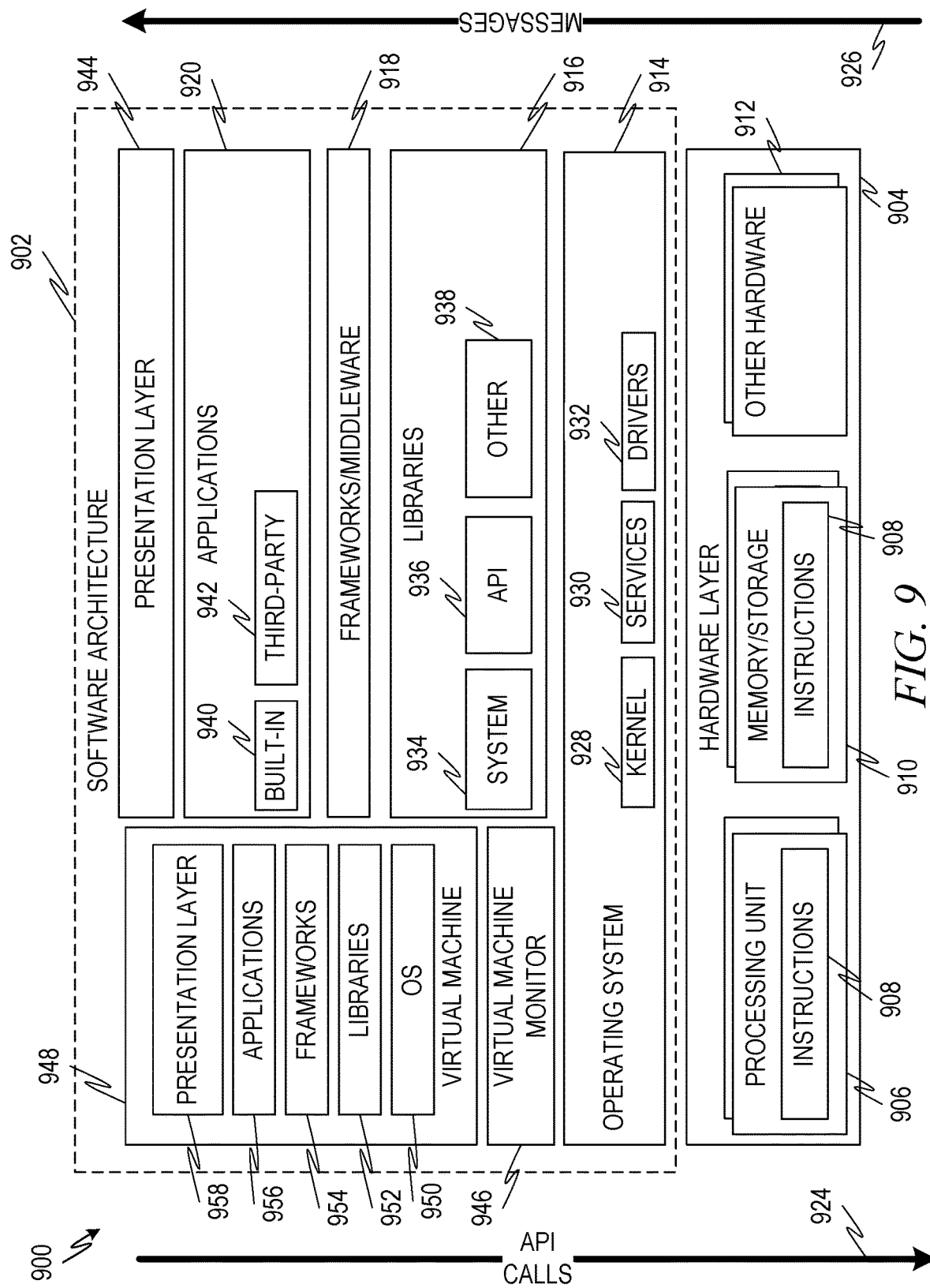
FIG. 9 is a block diagram showing one example of a software architecture for a computing device.

FIG. 9 is a block diagram 900 showing one example of a software architecture 902 for a computing device. The architecture 902 may be used in conjunction with various hardware architectures, for example, as described herein. FIG. 9 is merely a non-limiting example of a software architecture and many other architectures may be implemented to facilitate the functionality described herein. A representative hardware layer 904 is illustrated and can represent, for example, any of the above referenced computing devices. In some examples, the hardware layer 904 may be implemented according to the architecture of the computer system of FIG. 9.

The representative hardware layer 904 comprises one or more processing units 906 having associated executable instructions 908. Executable instructions 908 represent the executable instructions of the software architecture 902, including implementation of the methods, modules, subsystems, and components, and so forth described herein and may also include memory and/or storage modules 910, which also have executable instructions 908. Hardware layer 904 may also comprise other hardware as indicated by other hardware 912, which represents any other hardware of the hardware layer 904, such as the other hardware illustrated as part of the software architecture 902.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920, and presentation layer 944. Operationally, the applications 920 and/or other components within the layers may invoke application programming interface (API) calls 924 through the software stack and access a response, returned values, and so forth illustrated as messages 926 in response to the API calls 924. The layers illustrated are representative in nature and not all software architectures have all layers. For example, some mobile or special purpose operating systems may not provide a frameworks/middleware 918 layer, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the architecture 902 to pause its current processing and execute an interrupt service routine (ISR) when an interrupt is accessed.

The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks/middleware 918 may provide a higher-level common infrastructure that may be utilized by the applications 920 and/or other software components/modules. For example, the frameworks/middleware 918 may provide various graphical user interface (GUI) functions, high-level resource management, high-level location services, and so forth. The frameworks/middleware 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a media application, a messaging application, and/or a game application. Third-party applications 942 may include any of the built-in applications as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 942 may invoke the API calls 924 provided by the mobile operating system such as operating system 914 to facilitate functionality described herein.

The applications 920 may utilize built-in operating system functions (e.g., kernel 928, services 930 and/or drivers 932), libraries (e.g., system libraries 934, API libraries 936, and other libraries 938), frameworks/middleware 918 to create user interfaces to interact with users of the system. Alternatively, or additionally, in some systems, interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware computing device. A virtual machine is hosted by a host operating system (operating system 914) and typically, although not always, has a virtual machine monitor 946, which manages the operation of the virtual machine 948 as well as the interface with the host operating system (i.e., operating system 914). A software architecture executes within the virtual machine 948 such as an operating system 950, libraries 952, frameworks/middleware 954, applications 956, and/or presentation layer 958. These layers of software architecture executing within the virtual machine 948 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 10:
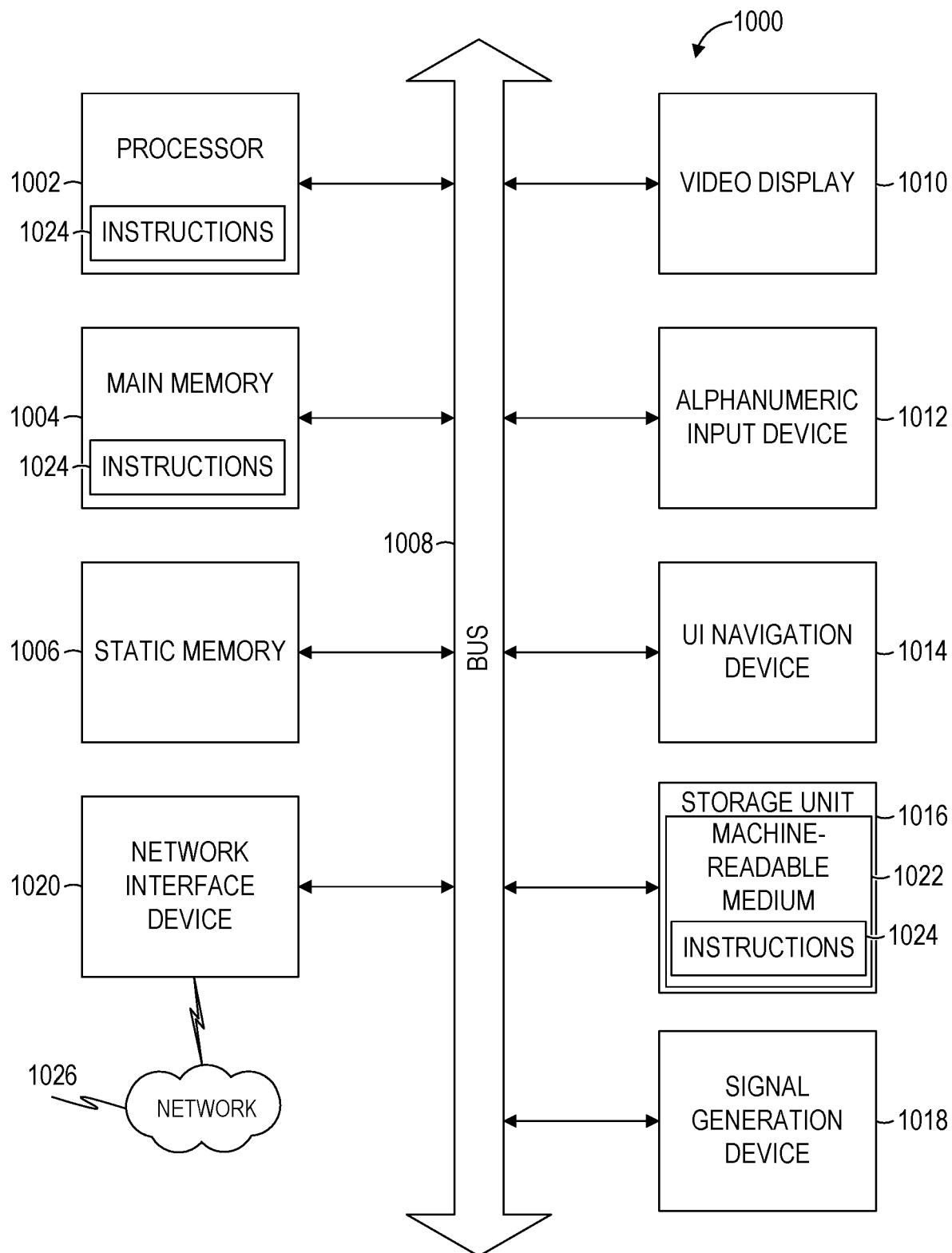
FIG. 10 is a block diagram of a machine in the example form of a computer system within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation (or cursor control) device 1014 (e.g., a mouse), a storage unit 1016, a signal generation device 1018 (e.g., a speaker), and a network interface device 1020.

Machine-Readable Medium

The storage unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media 1022.

While the machine-readable medium 1022 is shown in FIG. 10 to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1024 may further be transmitted or received over a communications network 1026 using a transmission medium. The instructions 1024 may be transmitted using the network interface device 1020 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
    identifying, by one or more processors, a set of entities from text, at least one entity of the set of entities being a business object recognized by a keyword that indicates a type of the business object followed by a number that indicates a particular business object of the type;
    identifying, by the one or more processors, a set of verbs from the text;
    identifying, by the one or more processors and from the text, a set of relations between pairs of entities of the set of entities;
    creating, by the one or more processors, a knowledge graph based on the set of entities, the set of verbs, and the set of relations;
    storing the knowledge graph in a memory;
    causing presentation of a user interface on a display device;
    receiving, via the user interface, a topic;
    searching the knowledge graph for nodes that match the topic; and
    causing display of at least one of the nodes that match the topic, a first node connected to the at least one of the nodes, a second node connected to the at least one of the nodes, a first relationship between the first connected node and the at least one of the nodes, and a second, different, relationship between the second connected node and the at least one of the nodes.

2. The method of claim 1, wherein the storing of the knowledge graph in the memory comprises not storing the text in the memory.

3. The method of claim 1, wherein the identifying of the set of entities from the text comprises applying named entity recognition (NER) to the text.

4. The method of claim 1, wherein the identifying of the set of verbs from the text comprises looking up words in a database of verbs.

5. The method of claim 1, wherein the identifying of the set of entities from the text comprises applying business object recognition to the text.

6. The method of claim 1, further comprising:
    comparing the knowledge graph and a second knowledge graph to determine a degree of similarity between the text and a second text.

7. The method of claim 1, wherein the text is an email.

8. The method of claim 1, further comprising:
    using a trained machine learning model, generating an approximation of the text from the knowledge graph.

9. A system comprising:
    a memory that stores instructions; and
    one or more processors configured by the instructions to perform operations comprising:
        identifying a set of entities from text, at least one entity of the set of entities being a business object recognized by a keyword that indicates a type of the business object followed by a number that indicates a particular business object of the type;

identifying a set of verbs from the text;

identifying, from the text, a set of relations between pairs of entities of the set of entities;

creating a knowledge graph based on the set of entities, the set of verbs, and the set of relations;

storing the knowledge graph in the memory;

causing presentation of a user interface on a display device;

receiving, via the user interface, a topic;

searching the knowledge graph for nodes that match the topic; and causing display of at least one of the nodes that match the topic, a first node connected to the at least one of the nodes, a second node connected to the at least one of the nodes, a first relationship between the first connected node and the at least one of the nodes, and a second, different, relationship between the second connected node and the at least one of the nodes.

10. The system of claim 9, wherein the storing of the knowledge graph in the memory comprises not storing the text in the memory.

11. The system of claim 9, wherein the identifying of the set of entities from the text comprises applying named entity recognition (NER) to the text.

12. The system of claim 9, wherein the identifying of the set of verbs from the text comprises looking up words in a database of verbs.

13. The system of claim 9, wherein the identifying of the set of entities from the text comprises applying business object recognition to the text.

14. The system of claim 9, wherein the operations further comprise:

comparing the knowledge graph and a second knowledge graph to determine a degree of similarity between the text and a second text.

15. The system of claim 9, wherein the text is an email.

16. The system of claim 9, wherein the operations further comprise:

using a trained machine learning model, generating an approximation of the text from the knowledge graph.

17. A non-transitory computer-readable medium that stores instructions that, when executed by one or more processors, cause the one or more processors to perform operations comprising:

identifying a set of entities from text, at least one entity of the set of entities being a business object recognized by a keyword that indicates a type of the business object followed by a number that indicates a particular business object of the type;

identifying a set of verbs from the text;

identifying, from the text, a set of relations between pairs of entities of the set of entities;

creating a knowledge graph based on the set of entities, the set of verbs, and the set of relations;

storing the knowledge graph in a memory;

causing presentation of a user interface on a display device;

receiving, via the user interface, a topic;

searching the knowledge graph for nodes that match the topic; and causing display of at least one of the nodes that match the topic, a first node connected to the at least one of the nodes, a second node connected to the at least one of the nodes, a first relationship between the first connected node and the at least one of the nodes, and a second, different, relationship between the second connected node and the at least one of the nodes.

18. The non-transitory computer-readable medium of claim 17, wherein the storing of the knowledge graph in the memory comprises not storing the text in the memory.

19. The non-transitory computer-readable medium of claim 17, wherein the identifying of the set of entities from the text comprises applying named entity recognition (NER) to the text.

20. The non-transitory computer-readable medium of claim 17, wherein the identifying of the set of verbs from the text comprises looking up words in a database of verbs.

* * * * *